United States Patent

[11] 3,601,410

| [72] | Inventor | Paul Andre Guinard<br>Saint-Cloud, France |
|---|---|---|
| [21] | Appl. No. | 842,218 |
| [22] | Filed | July 16, 1969 |
| [45] | Patented | Aug. 24, 1971 |
| [73] | Assignee | Etablissements Pompes Guinard, Societe Anonyme |
| [32] | Priority | July 17, 1968 |
| [33] | | France |
| [31] | | 159,520 |

[54] DEVICE FOR FREE JUNCTION BETWEEN TWO PIPES
3 Claims, 3 Drawing Figs.

[52] U.S. Cl. .................................................. 277/27,
277/73, 285/9, 285/10
[51] Int. Cl. .................................................. F16j 15/34,
F16l 17/00
[50] Field of Search.......................................... 285/10, 11,
13, 14, 9, 95, DIG. 1; 277/27, 3, 73

[56] References Cited
UNITED STATES PATENTS

| 1,666,495 | 4/1928 | Hodgkinson | 285/10 |
| 1,888,026 | 11/1932 | Chapman | 285/11 |
| 3,462,159 | 8/1969 | Baumann et al. | 277/27 |

FOREIGN PATENTS

| 676,355 | 12/1963 | Canada | 285/B.P. |
| 1,268,692 | 6/1961 | France | 277/3 |
| 258,408 | 4/1913 | Germany | 285/9 |
| 280,219 | 11/1914 | Germany | 285/10 |
| 1,149,209 | 5/1963 | Germany | 277/3 |

Primary Examiner—Thomas F. Callaghan
Attorneys—Robert E. Burns and Emmanual J. Lobato ABSTRACT: A pipe junction comprising a first pipe, a second pipe having one end in register with the first pipe, a flange on said end of the second pipe, a floating ring cooperating with the first pipe and axially movable relative thereto, an annular plate on the ring for cooperation with the flange permitting transverse movement therebetween and means on the ring responsive to fluid pressure within the pipes to maintain the ring in equilibrium relative to the flange by the combined effects of fluid pressure on the ring within the pipes and fluid pressure acting between the plate and flange.

PATENTED AUG 24 1971   3,601,410
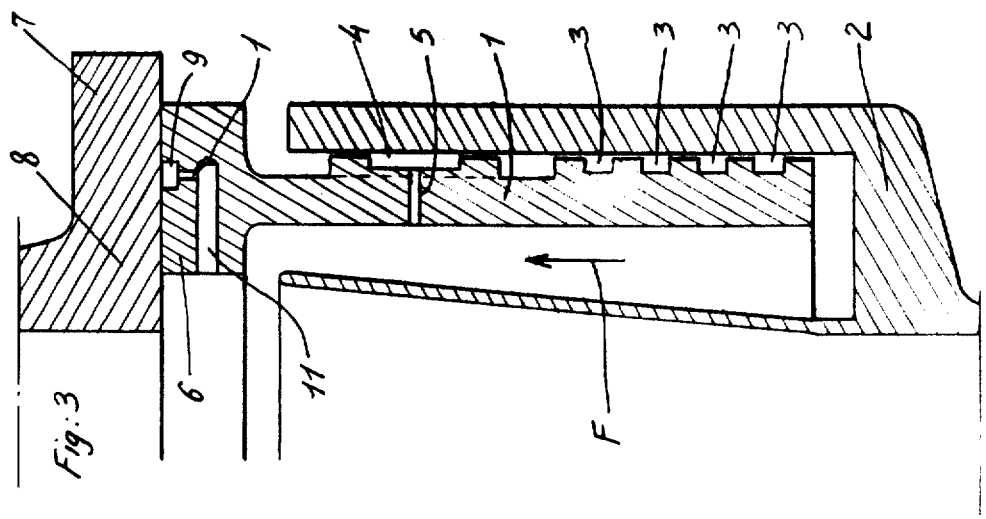
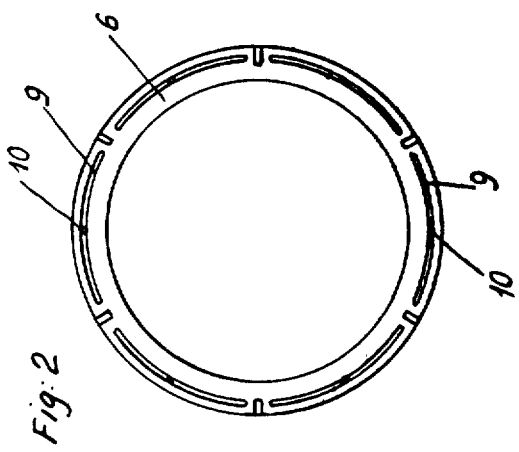
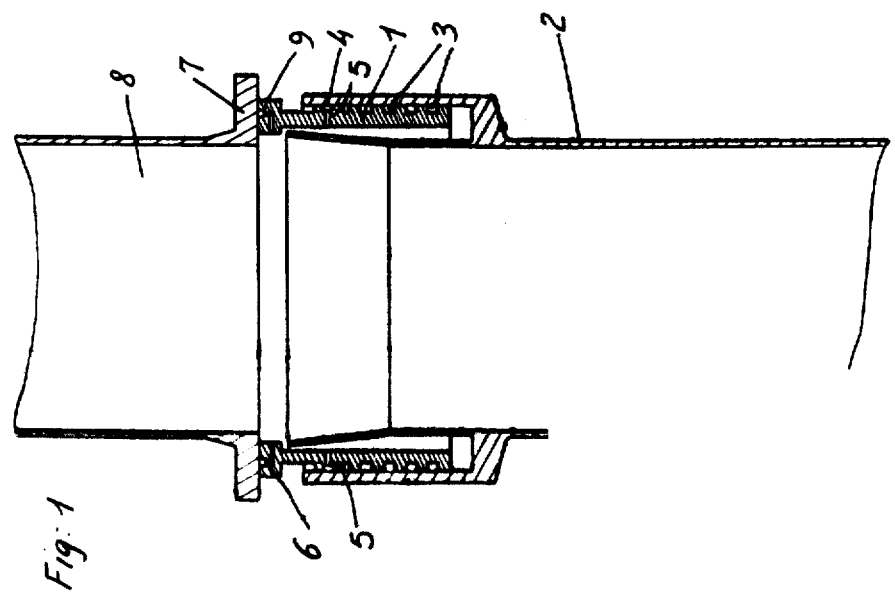

3,601,410

DEVICE FOR FREE JUNCTION BETWEEN TWO PIPES

BACKGROUND OF THE INVENTION

The present invention relates to a device for free junction intended to suppress the reactions of pipe systems upon an assembly when these tend to shift under various actions certain of which can be caused by expansions resulting especially from variations of temperature of fluids circulating in the said assembly.

Devices for junction between two piping elements are known in which the seal of the junction is effected by a ring which is axially movable in one of the elements in which it is guided through the intermediary of sealing joints and which is applied by the pressure of the fluid passing through the pipe system and possibly by a spring against a shoulder or flange formed on the other element. However, these known devices do not permit of eliminating the transverse reactions of the pipe systems.

Moreover rotating packings or stops are known between a fixed element and a rotating and axially movable element, wherein the seal between the fixed element and the rotating element is effected by a film of liquid which establishes itself between these two elements or between one of these elements and an axially movable intermediate element, one of the surfaces between which this liquid film establishes itself having pockets supplied with liquid under pressure through orifices of narrow cross section formed in the bottoms of these pockets.

BRIEF SUMMARY OF THE INVENTION

The device for free junction between two pipe elements according to the present invention, which permits of suppressing the reactions exerted between these elements, comprises a floating ring which is axially movable in one of the pipe elements and includes a plate at one of its ends facing a flange formed on the end of the other pipe element and capable of shifting freely in the transverse direction in relation to the said plate, which is thrust constantly towards the said flange by the pressure of the fluids conveyed through the pipe system and is kept in equilibrium against this flange by the combined effects of the liquid film established between the flange and the plate of the floating ring and of the pressure acting simultaneously upon this ring.

On its cylindrical surface the movable ring preferably comprises a series of expansion grooves and regularly distributed pockets supplied with the fluid under pressure.

Conveniently, the plate arranged on the end of the floating ring has a circular groove or a plurality of regularly distributed pockets supplied with fluid under pressure through orifices which are formed in the bottoms of these pockets and supplied with fluid under pressure.

Preferably, the device for the hydrostatic equilibrium of the plate, which is realized by the establishment of a film of liquid between the plate and the flange, comprises calibrated passages which directly connect the said grooves and pockets with the interior of the fluid conduit.

The floating ring is preferably kept constantly centered in its housing by a series of pockets situated on the cylindrical part.

The invention will be further described, by way of example, with reference to the preferred embodiments illustrated in the accompanying drawings, in which:

FIG. 1 is an overall elevation, in longitudinal axial section, of a device for free junction between two pipes.

FIG. 2 is a plan view of the plate of the floating ring.

FIG. 3 is a partial detailed view of this device in section and on a larger scale.

The free junction device according to the invention is constituted by a floating ring 1 which can move telescopically at the end of a pipe element 2. This ring comprises a series of peripheral expansion grooves 3 and a series of pockets 4 into which the fluid under pressure circulating in the pipe system is admitted directly through perforations 5; These pockets are intended to center the floating ring in the pipe element.

The outer end of the floating ring forms a plate 6 which is constantly thrust in the direction of the arrow F (see FIG. 3) by the pressure acting upon this floating ring, in order to apply the plate 6 against a corresponding flange 7 pertaining to the other pipe element 8.

The floating ring 1 can move telescopically in translation as a function of the movement together or apart of the two pipe elements 2 and 8. Moreover the lateral displacement of one of the pipe elements in relation to the other is also enabled by virtue of the plate 6 and the flange 7.

The plate 6 is of the hydrostatic type and is provided with a series of pockets 9 into which the fluid under pressure circulating in the pipe system is admitted through the passages 10 and 11. Under these circumstances the pressure establishes itself in the pockets 9 in order to equilibrate the floating ring 1. Thus the plate is kept spaced from the flange by a constant value. In effect, when the clearance tends to increase the leakage section tends to increase and the pressure in the pockets 9 tends to decrease, since the supply flow to the pockets is limited by the calibrated passage 10. The floating ring 1, being out of balance, is then returned towards the flange 7. When the clearance tends to decrease the leakage section tends to decrease, the pressure in the pockets tends to increase and the floating ring is thrust back. The same phenomenon prevents the floating ring from rocking, by maintaining a constant clearance at all points of the device. The film of liquid created between the plate 6 and the collar 7 by the permanent leakage permits relative lateral displacements, without effort and without jarring.

Furthermore, as the floating ring 2 possesses a slight peripheral clearance permitting the fluid under pressure to circulate at its periphery, the telescopic displacement of this floating ring can likewise be effected progressively and without effort.

In a variant, the plate 6 would be oblique in relation to the longitudinal axis of the floating ring.

I claim:

1. A pipe junction comprising a first pipe having a cylindrical enlarged section part at one end, a floating ring comprising a cylindrical part having an external surface cooperating with the internal surface of said cylindrical enlarged section part of the end of the pipe and axially movable relative thereto, a second pipe having one end in register with said ring and provided with a flange, an annular plate of the ring having a face for cooperation with the flange to permit transverse movement therebetween and means on the ring responsive to fluid pressure within the pipes to maintain the ring in hydrostatical equilibrium relative to the flange by the combined effects on the ring of fluid pressure within the pipes urging the ring towards the flange and of the fluid pressure prevailing in the film of liquid formed between the plate and the flange, the plate of the ring having at least one pocket symmetrically formed therein and calibrated passages communicating between the pocket and the interior of the pipes, the external cylindrical surface of the floating ring being provided with means for automatically centering the ring in said enlarged section part of the first pipe.

2. A pipe junction according to claim 1 in which the end of the first pipe comprises an annular housing defined by said cylindrical enlarged section part of said first pipe end and a slightly divergent conical extension of said pipe projecting in the interior of the said enlarged part towards the outer end thereof, the cylindrical part of the floating ring projecting into said annular housing.

3. A pipe junction according to claim 1 in which said pressure regulating means for automatically centering the ring in the enlarged section part of the first pipe are a series of expansion grooves and regularly distributed pockets on said external cylindrical surface of the ring and channel means communicating between the pockets and the interior of the pipe to react with the housing to center the floating ring relative thereto.